United States Patent [19]
McKinney et al.

[11] 3,854,917
[45] Dec. 17, 1974

[54] METHOD OF AND APPARATUS FOR PROCESSING FLEXIBLE SHEET MATERIAL

[75] Inventors: C. Daniel McKinney, Anderson; Forrest C. Vickery, Williamston, both of S.C.

[73] Assignee: Owens-Corning Fiberglas Corporation, Toledo, Ohio

[22] Filed: Oct. 16, 1972

[21] Appl. No.: 298,069

[52] U.S. Cl. .............................. 65/3, 65/4, 65/9, 156/167, 156/181, 156/200, 156/226, 156/227, 156/441, 156/444, 270/69
[51] Int. Cl. ... C03b 37/02, C03c 27/10, B32b 17/04
[58] Field of Search .......... 156/167, 181, 202, 227, 156/444, 441, 200, 204, 226; 270/69, 93; 93/84 FF; 65/3, 4, 9

[56] References Cited
UNITED STATES PATENTS

| | | | |
|---|---|---|---|
| 3,110,232 | 11/1963 | Frei | 93/49 |
| 3,338,773 | 8/1967 | Schneider | 156/444 |
| 2,605,195 | 7/1952 | Boughton | 156/444 |
| 3,318,746 | 5/1967 | Langlois | 156/181 |
| 3,442,751 | 5/1969 | Langlois | 156/167 |
| 3,295,942 | 1/1967 | Smock et al. | 156/181 |

*Primary Examiner*—Daniel J. Fritsch
*Attorney, Agent, or Firm*—Carl G. Staelin; John W. Overman; Ronald C. Hudgens

[57] ABSTRACT

Method of and apparatus for establishing an edge at the marginal region of flexible sheet material such as subjecting the marginal region of an advancing fibrous mat to a stream of gaseous fluid effective to fold the mat in such region to form the edge.

9 Claims, 14 Drawing Figures

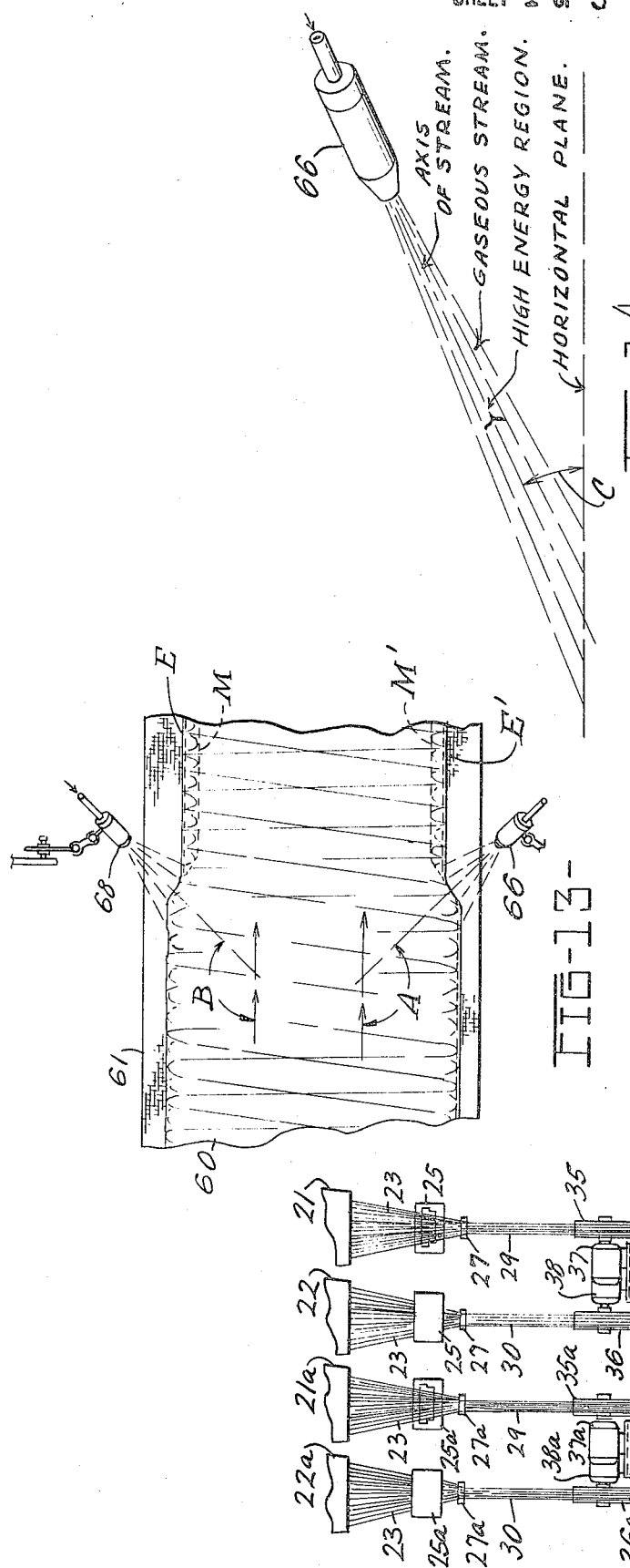
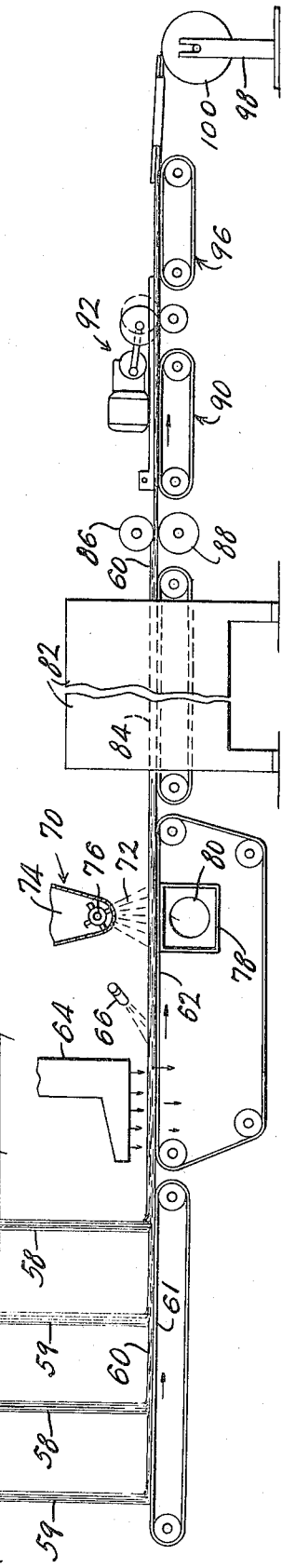

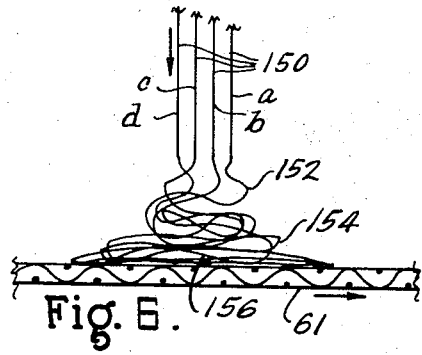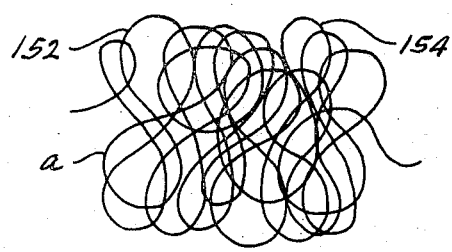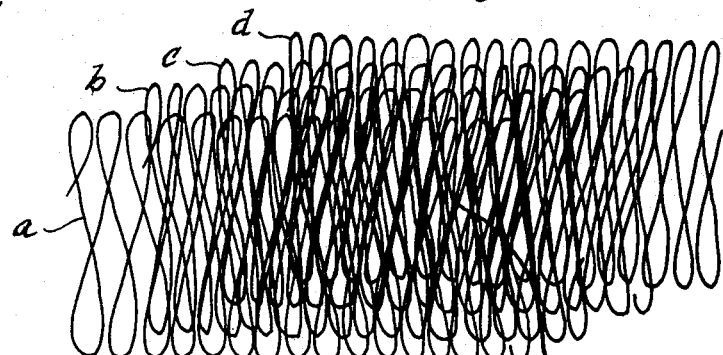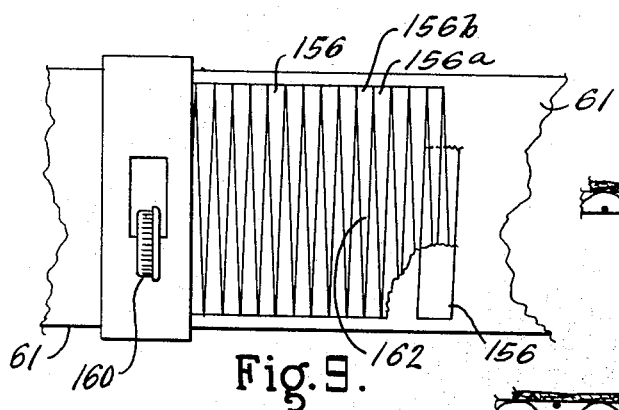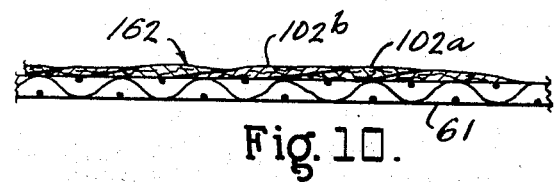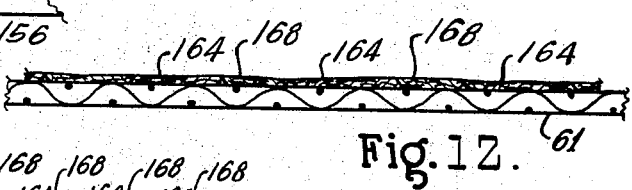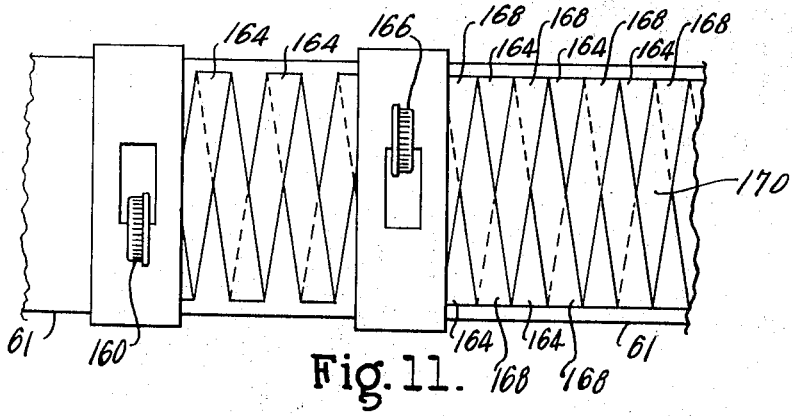

METHOD OF AND APPARATUS FOR PROCESSING FLEXIBLE SHEET MATERIAL

BACKGROUND OF THE INVENTION

Mats of fibrous glass, because of their inherent properties, especially those of strength and inertness, have many uses. They have been employed as filtering, acoustical and thermal insulating media. They also serve effectively for roofing sheets, non-woven fabrics, and for reinforcing plastic products.

In some instances the mats are composed of short fibers held together by a binder. In others the mats are bonded webs or chopped fibrous glass strands. Bundles or strands of continuous glass filaments have also been disposed in mat form. Strands of continuous filaments have superior strength because of the continuous nature of the filaments and their concentrated association in strand form. Accordingly, fibrous glass strands are a most desirable mat constituent where strength is a prime consideration.

However, there have been difficulties involved in the fabrication of strand mats as well as deficiencies in such mat products. Because of the comparative greater bulk of the standard fibrous glass strands, they are not inclined to become easily entangled to form an integrated mass. They also are not disposed to lie in a flat formation. A further objection has been that the production of such mats has been costly due to requirement of special equipment and slow and involved processing.

Also, in mats of conventional types there is a lack of integrity, irregular of insufficient strength and porosity, and lack of uniform thickness.

Further, there has been an economic need to produce wider yet still uniformly thick continuous strand mats on existing equipment. But control of mat at its edges during production has not been feasible. Lack of strand control at the edge of the mats during production causes uneven mat edges; the material at these uneven edges tends to become entangled in equipment. The result is damaged mat.

SUMMARY OF THE INVENTION

It is an object to provide improved apparatus for producing an integrated mat or other body of bonded strands in which the strands are of comparatively smaller size, and are associated in a particularly orderly and uniform manner providing a high degree of strength and porosity.

A further object is the provision of a continuous, efficient process for dependably and economically producing such bodies of fibrous glass, particularly wider bodies.

Yet another object is apparatus for and method of effectively establishing edges at the marginal regions of flexible sheet material, especially loosely integrated fibrous sheet material such as continuous glass strand mats.

These and other objects and advantages are secured through the use and particular arrangement of a plurality of apparatus such as that disclosed herein incorporating a pull wheel for drawing glass filaments and grooved guide shoes for gathering them into a plurality of strands directed in closely aligned, parallel formation back and forth across a traveling conveyor, and collected as an integrated mat upon the conveyor, and controlling the width of such mat by edge establishing apparatus.

The above and other objects and advantages will become more apparent as the invention is more fully described hereinafter with reference made to the accompanying drawings.

DESCRIPTION OF THE DRAWINGS

FIG. 1 is a side elevation view of apparatus for producing continuous filament glass strand mat embodying the principles of the invention.

FIG. 6 is a side elevational view of a group of four strands being deposited on a conveyor;

FIG. 7 is a plan view showing the type of loopy deposite of a single strand;

FIG. 8 depicts, diagrammatically and in a simplified form, the interleaving of loops of four strands in a strip deposited upon a receiving surface;

FIG. 9 is a plan view of a single pull wheel, associated conveyor and one form of mat which may be laid by a single wheel;

FIG. 10 is a vertical section of a portion of the mat and conveyor of FIG. 9;

FIG. 11 is a plan view of two pull wheels, an associated conveyor, and a pattern of mat which may be laid by two pull wheels; and FIG. 12 is a vertical section of a portion of the mat and conveyor of FIG. 11.

FIG. 13 is a plan view of the edge establishing apparatus illustrated in FIG. 1;

FIG. 14 is a somewhat enlarged side elevation view of a stream releasing nozzle shown in FIGS. 1 and 12. The dashed lines indicate the shape of the stream discharged from the nozzle. Angle C is an angle formed between the axis of the stream on the horizontal.

DESCRIPTION OF THE PREFERRED EMBODIMENTS

Figure 2:
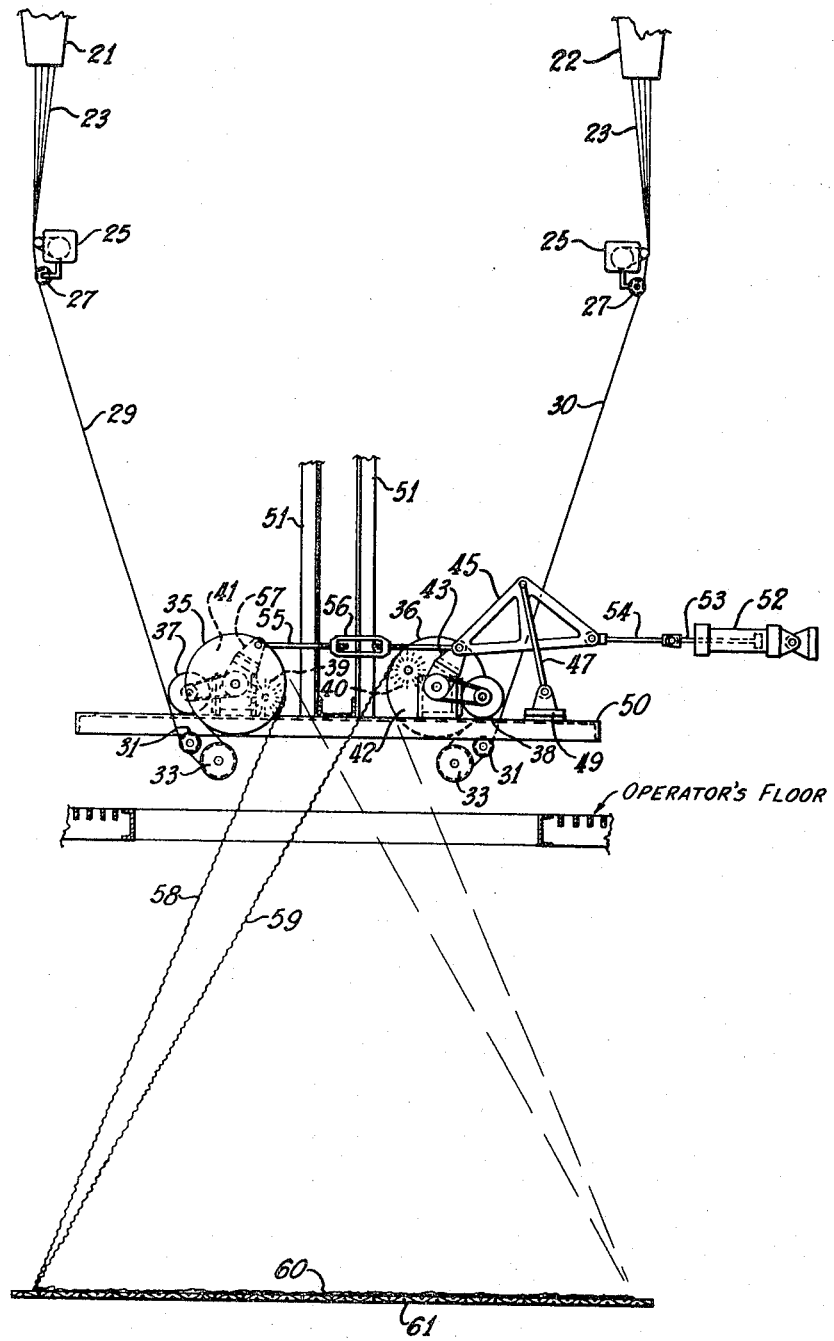
FIG. 2 is a front elevation view of the filament forming and strand distributing portion of the apparatus shown in FIG. 1.
Figure 3:
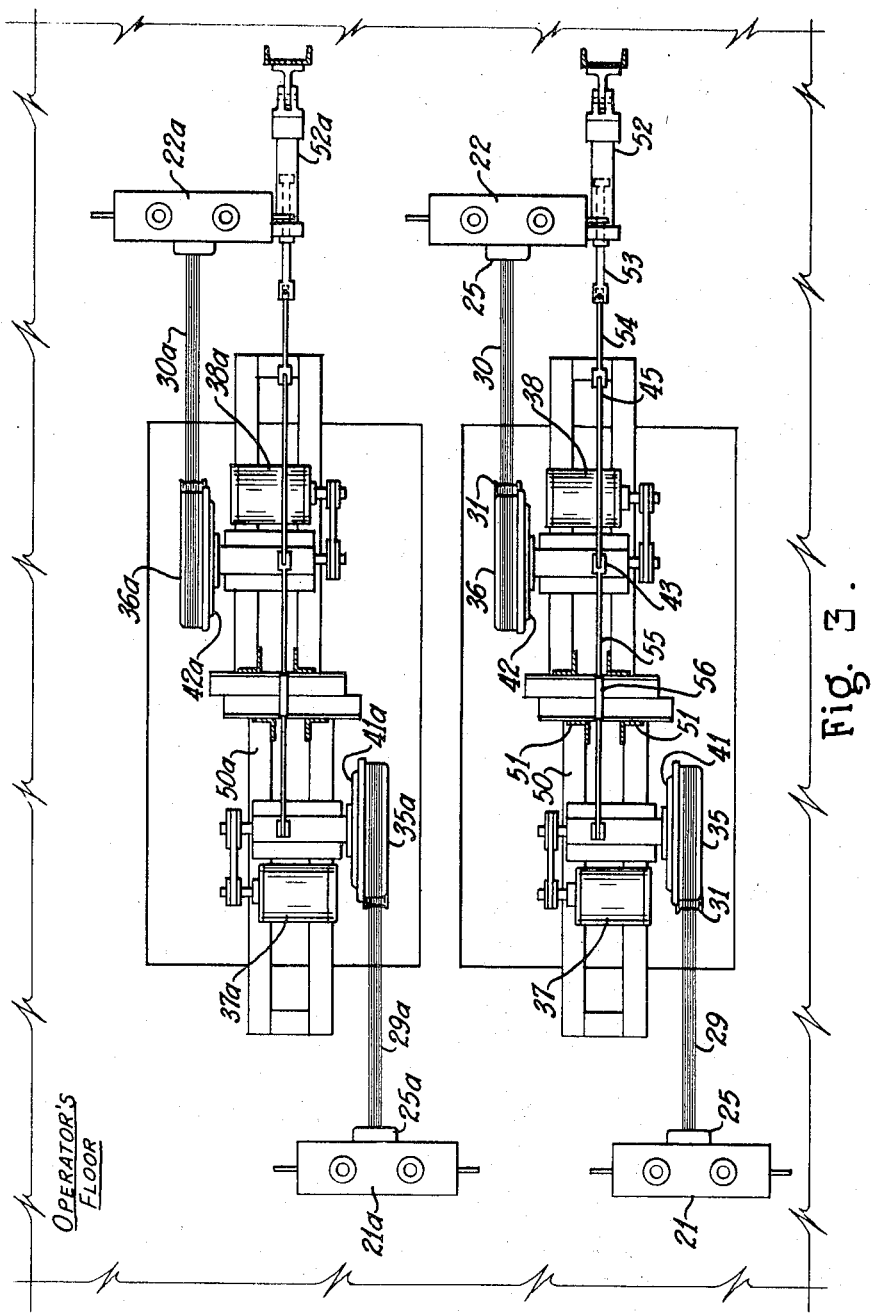
FIG. 3 is an enlarged plan view of the apparatus of FIG. 2.

Referring to the drawings in more detail, the apparatus of FIGS. 1 through 3 includes pairs of molten glass feeding bushings, 21 and 22 and 21a and 22a depending from conventional glass melting tanks that are not shown. The main components carry the same identifying numbers as the like parts of the apparatus but with the letter a following each number.

Continuous filaments 23 are drawn from the minute streams of molten glass issuing from orifices of the bushings. It will be considered that a bushing with 352 orifices is used and the filaments are drawn to an average diameter of fifty hundred thousandths of an inch.

A liquid size is applied to the filaments as the latter pass over traveling belts or aprons on conventional size applicators 25. The size may merely be water to reduce friction between filaments as they are subsequently joined together in strand form and to supply moisture for cooperation in the distribution of dry binder particles, later added. However, a more complex size or binder is desired to promote coherence of the filaments when combined as strands, and adherence of the strands of filaments to the surface of pulling wheels. Where the mat produced is to be ultimately combined with a plastic resin, it is also desirable to include a coupling agent in the size which facilitates wetting of the mat by the resin.

Since the primary size or binder is applied as a continuous coating on the fibers and therethrough on the strands, and a secondary binder in particulate form is scattered through the mat in comparatively widely spaced relation, the coupling agent in the continuous coating is readily contacted by the resin with which the mat may be later laminated. This is an important feature in combining a primary liquid size or binder with a later applied powder binder.

A preferred form of primary binder is one retaining sufficient cohesive properties when cured to controbute to or, for some purposes, to completely bond the strands in the mat or other form in which they are collected on the conveyor or the receiving surface. Such a binder has the dual purpose of holding the filaments together as strands and of bonding the strands into a integrated body.

Since the mats are produced immediately below the glass filament forming stations, a commonly used lubricant component of the size may be omitted. The inclusion of such a lubricating material has been found necessary for improving the handleability of the strands where the strands go through subsequent operations such as plying and twisting, but it is not otherwise necessary, and in fact interferes with effective wetting of the strands by a plastic resin.

The filaments from each bushing, after sizing, are grouped together to form a set of six strands individually segregated as they travel within six grooves over the respective gathering shoe 27. Each strand contains about 60 filaments. The division of the filaments into strands is here accomplished manually at the start of operations.

The sets of strands 29 and 30 pass under the aligning shoes 31 which are grooved in the same manner as the gathering shoes 27.

To help keep the pull wheels clean of size and to distribute the wearing action of the strands on the pull wheel the aligning shoes may be given a slight traversing action. This slowly shifts the strand position on the pulling wheel, moving back and forth about once in 3 minutes.

From shoes 31 the two sets of spaced strands 29 and 30 are led around the two idler wheels 33 and respectively travel around the pull wheels 35 and 36. These wheels are similarly constructed but are relatively reversed in position.

Motors 37 and 38 respectively drive pull wheels 35 and 36. The strands carried by pull wheel 35 are released therefrom by the successive projection of fingers of an oscillating spoke wheel 39 through slots in the peripheral surface of the pull wheel 35, while the fingers of spoke wheel 40 serve this purpose in connection with pull wheel 36. The strands are kinetically projected in tangential paths from the pull wheels.

The rear side of each pull wheel is covered by an independently mounted, oscillatable back plate on which the associated spoke wheel is carried. Back plate 42 of the assembly including pull wheel 36 is arcuately oscillated through arm 43. The latter is driven by functioning of the fluid cylinder 52 which sets through the triangular line 45, which pivots upon bar 47 on the base 49. The piston rod 53 extending from the cylinder is joined to the triangular link 45 by linking rod 54. The base 49 is positioned on the platform 50 which also supports the pull wheels 35 and 36 and the equipment associated therewith. Platform 50 is suspended by angle iron hangers 51.

Through the connecting assembly 55, including the turnbuckel 56, the transverse movement of the triangular link 45 is transmitted to arm 57 to arcuately oscillate the spoke wheel 39 within the pull wheel 35. This oscillation is preferably in an arc of approximately 57°. With the single means effecting the oscillation of both spoke wheels their action may be closely synchronized.

The group of strands 58 thrown down by the pull wheel 35 and the group of strands 59 thrown down by the pull wheel 36, and the strands from any other pull wheels preceding this air are accumulated as a thin wet mat 60 upon a horizontally traveling porous conveyor 61, which is preferably of carbon steel chain construction.

Substantially the entire width of the conveyor 61 is covered by the mat 60, but this may be varied through a wide range of changing the length of the oscillating arc of the spoke wheels and the distance of the pull wheels above the conveyor. Ordinarily the width utilized would be between extreme limits of 2 and 9 feet.

The mat 60 is moved to an intermediate porous conveyor 62, which like the conveyor 61 is preferably a carbon steel chain construction. The conveyor 62 has the same width as the conveyor 61.

The conveyor 62 moves the wet mat 60 through a preliminary drying zone. A dryer 64, which may be any suitable type such as a forced air thermal dryer, an infra-red drying unit or a high frequency dryer, removes moisture from the mat 60. In practice the dryer 64 is controlled to effect substantially uniform moisture removal throughout the thickness of the mat 60. But the dryer 64 can be controlled to effect variations in moisture removal through the thickness of the mat, for example, as set forth in U.S. Pat. No. 3,318,746.

The conveyor 62 advances the mat 60 from the dryer 64 to edge establishing or forming apparatus that reduces the width of the advancing mat 60. In the embodiment of FIG. 1 the edge establishing apparatus includes two spaced apart nozzles 66 and 68 (also see FIGS. 13 and 14). These nozzles are above and at opposite sides of the advancing longitudinal mat 60 and are shown held for movement on ball joint mountings. Each of these nozzles directs a gaseous stream against opposing marginal regions of the mat 60; these streams are effective to reduce the width of the mat as more fully explained hereinafter.

From the nozzles 66 and 68 the moving conveyor 62 advances the mat 60 under a binder applicator 70 that provides a descending cloud of dry binder in powder form, i.e., particles 72, onto the mat 60. The applicator 70 includes an open bottomed container 74 having an interior rotatably driven vane 76 across its open bottom. Rotation of the vane 76 meters the dry binder particles 72 held in the container 74 through its open bottom.

The binder in powder form may be the same resin as that of the liquid size or one compatible therewith. Polyesters, phenolics, acetates and acrylics are among those that have proved satisfactory.

As the strands are deposited in mat formation they carry a liquid size generally between 26 and 31 percent by weight. The liquid tends to gather at contact points between overlying strands.

When the binder particles 72 strike a strand in the mat 60, they may bounce away or may be held by moisture remaining on the strand. Such attachment usually occurs when a binder particle hits adjacent points of cross over between overlying strands. Such particles may be structurally caught between closely angled adjacent strands, held by residual liquid in webs at such points, held by liquid still present along a single strand, or hung by surface moisture between closely positioned strands. A few particles not caught by the strands of the mat 60 pass through the openings of the conveyor 62 into an exhaust compartment 78. Having an opening 80 through which the superfluous particles 72 are drawn to a remote location.

The mat 60 treated with the binder particles 72 advances through an oven 82 on a conveyor 84. In the embodiment shown the width of both the conveyor 84 and the oven 82 are less than the width of the conveyor 62 (and the conveyor 61). But the streams of gaseous fluid from the nozzles 66 and 68 reduce the width of the mat 60 so that the mat can advance through the oven 82.

The oven 82, which is normally a thermal oven in practice, fuses the binder particles to unite the strands into a fully integrated fibrous body or mat 60.

upon leaving the oven 82 the mat 60 passes between cooperating rollers 86 and 88 for compaction. The rolls 86 and 88 are normally cooled.

A conveyor 90 transports the compacted mat 60 to a rotary cutter 92 that trims the edges of the mat, including the portion of the mat folded by the fluid streams from the nozzles 66 and 68.

A conveyor 96 moves the trimmed mat 60 to a roll strand 98 where the mat 60 is wound into a package 100.

Figure 4:
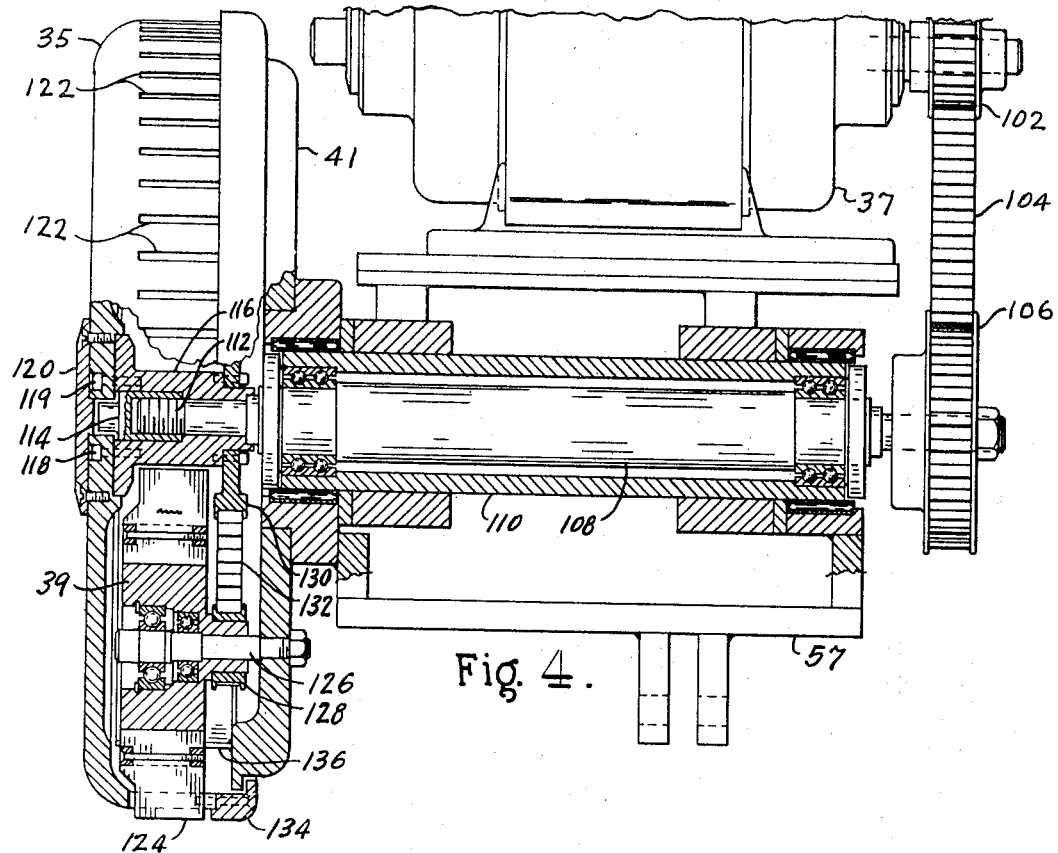
FIG. 4 is a side elevation with portions in section of one of the pull wheels and the motor drive therefore incorporated in the apparatus of FIG. 1–3.
Figure 5:
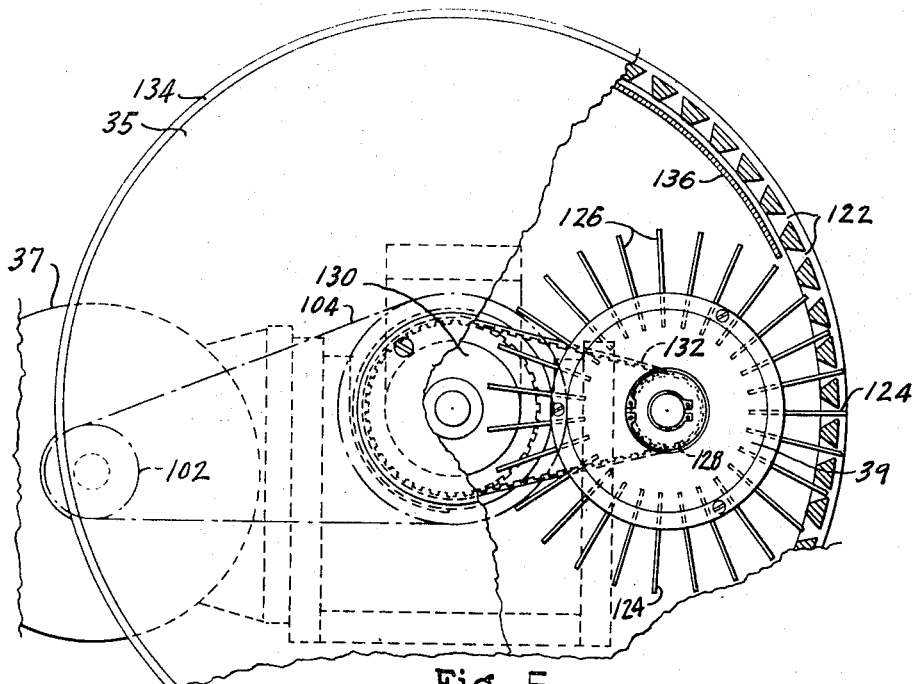
FIG. 5 is a fragmentary front view with parts broken away of the pull wheel and motor drive of FIG. 4 with the assembly turned 90° counterclockwise from the position of FIG. 4.

The pull wheel 35 and the drive therefore are shown in more detail in FIGS. 4 and 5. On the shaft of motor 37 is a toothed pulley 102 which has driving connection through the segmented timing belt 104 with toothed pulley 106. The latter is mounted on the outer end of shaft 108, on the other end of which is carried the pull wheel 35.

The shaft 108 is journaled in the stationary casing 110 upon which the motor 37 is supported. The pull wheel is held upon the threaded stud 112 of the shaft 108 by the barrel nut 114. The hub 116 of the pull wheel has a bored section fitting over the smooth portion of the stub 112 and held against a shoulder terminating the smooth portion by the barrel nut 114. The main body of the pull wheel is fastened to the hub 116 by machine screws 118 and 119. A cap 120 covers the outer end of the bore through the hub.

By way of example, dimensions of embodiment of the pull wheel 35 may be 12 inches in diameter and have a series of peripheral cross slots 122, approximately 1⅛ inches long, three-sixteenths of an inch wide and spaced five-sixteenths of an inch apart. To reduce the wear the strand receiving surface of the pull wheel is given a hard surface such as an electrolytic deposit of aluminum oxide or a coating of nickel phosphate.

The finger 124 of the spoke wheel 39 within the pull wheel 35 are dimensioned and motivated to successively project through the slots 122. The spoke wheel is mounted on shaft 126 projecting from the back plate 41 and carries the toothed pulley 128 on a rearward extension of the wheel hub 116.

The main body of the spoke wheel 39 is in this instance about 3¾ inches in diameter with the fingers 124, 27 in number, radially extending slightly more than thirteen-sixteenths of an inch from the periphery of the main body. The exterior portions of the fingers are generally of rectangular blade form one inch wide with a thickness of 0.024 of an inch. About one-eight of an inch of the outer end of the fingers extend out of the pull wheel slots at the point of their greatest projection.

The movement of the fingers 134 into the slots 122 and their momentary projection through the slots to release the strands is synchronized through the timing drive between the pull wheel and the spoke wheel. This includes the toothed pulley 130 fixed upon the hub 116 of the pull wheel, the cog timing belt 132 running over pulley 130, and the pulley 128 on the shaft 126 upon which the spoke wheel is journaled.

The back plate 41, oscillatable through yoke 57 to which it is attached, is mounted through bearings on the stationary casing 110. Yoke 57 and therethrough back plate 41 and the spoke wheel 39 are oscillated in an arc of approximately 57° by functioning of fluid cylinder 51.

Air movement into the interior of the pull wheel 35 is curtailed by the shroud ring 134 held to the inner edge of the wheel periphery by a series of machine screws. A baffle 136 interruptedly cylindrical in form, is carried by the oscillating back plate 41 and lies under the slots 122 except for an open section of the baffle in the region of the spoke wheel. This prevents air movement outwardly through the slots which is apt to irregularly release strands from the pull wheel. As the baffle oscillates with the spoke wheel, the open portion of the baffle is always in the area where the fingers 124 enter the slots 122 of the pull wheel.

With the high peripheral speed of the pull wheel, the strands are forcefully projected in straight tangential lines from the oscillating point of disengagement effected by the fingers of the spoke wheel. The kinetic energy the strands thus acquire carried them in relatively straight courses to the region of the conveyor surface. Here they are self-positioning in lazy whirl formation with each strand assuming an individualistic pattern but disposed in interengaging and interleaving relation with the other five strands of the set.

The distance of the pull wheels above the conveyor, and the rotational speed of the wheels are so selected, in relation to the specifications of the plurality of strands being deposited, that the strands are projected with sufficient kinetic energy to carry them as a band of generally constant form and in substantially regular paths to the surface of the conveyor or other collection surfaces.

The group of strands is thus deposited in a reciprocating strip disposed in a constant repeating pattern and with substantially stable dimensions.

Consequently, full control may be exercised to obtain a desired relationship between adjacent courses of the strip deposited from a single wheel and to complement or match the resulting pattern with that developed by the deposit of strips from associated pull wheels. The mat produced may thus be assured of having a thickness with a high degree of uniformity, or a definite repeated pattern of varying thicknesses, if such is required.

Variations in patterns can be imparted to the product by oscillating adjacent wheels in the system at different rates, or at different angles with respect to the line of travel of the conveyor. Also, the speed of the conveyor may be varied to alter the degree of pitch of the zig-zag strips being deposited.

A large range of relationships can be established between the strips laid by various pull wheels in the system, but any one product may be reproduced uniformly by locking the system into the dynamic relationship which has been found to produce the particular mat structure desired.

The control of various factors in the operation of the apparatus is important for the successful attainment of the feature of the invention comprising the creation of a mat or other body of fibrous strands having a high number of thin laminations or leaves of stable dimensions, which are superimposed in a controlled and regular manner. A uniformity of properties is thus obtained that has not otherwise been available.

While a balance of the various factors involved is required to establish the proper kinetic energy for carrying the strands in a dependable, regular fashion to the conveyor surface, the projection of the strands in close array helps prolong the integrity of the band formation. Evidently each strand aspirates air during its high speed descent and this tends to pull or hold adjacent strands together. The group of strands will travel further than a single strand before losing momentum and directional regularity because the retarding effect of the thin wall of air separating strands is reduced by the joint pull of such strands upon the air.

The total resistance opposing the group is thus materially less than the total resistance that would be encountered by the same number of strands projected individually.

When the strands reach the proximity of the conveyor surface, their kinetic energy has been quite completely dissipated through air drag and possibly by a braking effect transmitted upwardly by the immediately preceding deposited strand portions. Since the length of the strands thus deposited greatly exceed the length of the course upon which they are laid, the strands assume a looped formation. This looping is initiated above the surface of the conveyor and is generally characterized by irregularly shaped, figure eights with loops entending laterally as much as an inch or more from the preceding, comparatively straight path of each strand. The loops of adjacent strands possibly of all the strands of a strip are variously interleaved to integrate the deposited strip.

The profile of the usual strip of looped strands thus deposited on the conveyors is flat at the bottom and slightly but symmetrically curved across the top; the greatest elevation, actually of a low value, being at the center of the strip with a gradual diminution of the elevational dimension toward the edges of the strip. Thus, when such strips are overlapped by an amount generally in the order of one-half the width of the strips, the thickness dimension and the unit weight distribution across the width of thy mat layer thus formed is substantially uniform.

If the zig-zag sweep of the strips across the width of the collection zone from a single pull wheel is so arranged that the pitch or distance between adjacent parallel strips is greater than one-half the width of the strip, overlying layers must be supplied to fill in this gap and the overlap between different strips can be set to provide the desired uniformity in thickness and unit weight distribution of the mat. In this regard, the strips are overlapped in definite patterned relation to obtain the final flat mat of uniform thickness or weight.

When adjusting reciprocation and conveyor speeds to establish less overlapping or greater spacing between successive strips or passes of a band, it is recommended that one-half the width of the strip and an integer be taken as factors in determining the new strip advancing measurement.

By way of further developing the example set forth above, the size strands of each set led over the pulling wheel, as previously stated, are composed of an average of 60 filaments with each filament having a nominal diameter of fifty, hundred thousandths of an inch. The individual strands are roughly six thousandths of an inch in diameter and are delivered to the surface of the pull wheel closely arrayed in parallel relation and in a planar band. The strands may be uniformly spaced apart about one-eighth of an inch. A strip of the peripheral surface of the pulling wheel no more than one-half of an inch wide is then occupied by the set of six strands.

If it is desired to include a greater number of strands in a set drawn over the pull wheel they may be positioned more closely together. While probably 12 strands is about the maximum practical number, as many as 30 may be thrown down from a single wheel of the particular embodiment herein described. Under such conditions, the strands could be spaced only one thirty second of an inch apart. The number and spacing of the grooves on the stationary gathering shoes 27, and on the guiding shoes 31 ary arranged to space and guide the particular number of strands utilized.

The traction between the strands and the surface of the pull wheel is ample to furnish the pulling force required to attenuate the glass filaments formed from the minute molten glass streams issuing from the orifices of the furnace bushing. this adherence of the strands to the pull wheel although not fully understood is felt possibly due to the cohesive effect of the size carried by the strands and to other air and surface forces of attraction.

The pull wheel is driven at a speed of about 2,000 revolutions per minute to deliver the strands at a rate of 6,000 feet per minute. This rate may feasibly range from 2 to 12,000 feet per minute.

The fluid cylinder 51 in the example set forth is actuated 60 times a minute to cause the spoke wheels to oscillate at the same rate and to thus direct the strands released from the pull wheels back and forth across the conveyor 60 times per minute. Because of the high rate of deposit, even with 60 reciprocations of the strands across the conveyor per minute, 10 inches of strand is delivered to the conveyor for every inch of the strand travel across the conveyor. This explains why the strand repeatedly loops upon itself and upon the strands with which it is associated as it reaches the surface of the conveyor. Higher rates of reciprocation are feasible but, if raised substantially, should be coupled with higher feeding rates, if the same degree of looping of the strands and degree of coherence of the deposited strips is desired.

With a conveyor speed of 7 feet per minute and 60 strand reciprocations per minute there are 120 overlapped cross strips of strand for every 7 foot length of the deposited mat, with an average overlap of about two-thirds of an inch between the composite strips laid down from each pull wheel.

A succession of 12 pull wheels arranged in 6 pairs and handling strands assembled from filaments from 12 bushings is considered a desirable production system. This number is, of course, variable to meet any production requirements that may arise, and for lighter mats all of the pull wheels need not be utilized.

With 12 pull wheels and with the parallel strip portions laid from each wheel overlapping each other one-half of the width of a strip to effect a unitary layer of uniform thickness, the final mat will have twenty four laminations. While each lamination is thin, the strips thereof are concisely and regularly interleaved to form the lamination as an integral elemental part of the mat. Under such conditions, the effect of a slight variation in any one lamination is negligible in the over all mat, as each lamination is only a small part of the whole and any variation is apt to be balanced by a compensating variation in an adjacent, lamination; consequently the final product has outstanding uniformity.

In analyzing and determining the pattern to be formed, it is necessary to consider the parallel strip portions produced by bands moving across the conveyor in one direction only. These strip portions are generally parallel and it is the amount of their overlapping or spacing which govern the matching pattern to be deposited by subsequent pull wheels, which may be necessary to form a complete lamination of uniform thickness.

The parallel cross strip portions which are angled to the first described parallel strip portions produced by bands moving across the conveyor from the opposite side, having the same overlapping or spacing relation as the first described strip portions, and together with any required matching strips form a separate, duplicate lamination.

These laminations are units on a somewhat theoretical basis since the angled strips repeatedly cross each other. However, because of the thinness of the strips and their regular width dimensions, they form a continuous layer which from a practical standpoint can be considered as an elemental portion or building unit of the product.

As heretofore set forth, the method and product of this invention involve the linear projection of a closely arrayed group of comparatively light strands, the looped deposition and interleaving of the strands into integrated, dimensionally stable flat strips, and the mat or other body structure formed by the reciprocation deposit of the thin strips in overlapped patterned relation in a multiplicity of stacked laminations.

Characteristics of the invention may be better understood by reference to the illustrations in FIGS. 6 through 12. For simplification, strands 150 are shown in a projected band of four only, which are individually identified with the letters $a$, $b$, $c$ and $d$. This projected band of closely arrayed strands has followed a relatively straight, though reciprocating course until losing kinetic energy shortly before reaching the conveyor 61. At 152 the looping of the individual strands is initiated, with enlarging and interleaving of the loops at 154 as the strands are about to settle on the conveyor and together form the flat, thin integrated strip 156.

A typical looped pattern is shown in FIG. 7 of the single strand $a$ incorporating the particular loops 152 and 154 identified in FIG. 6. While the loops and swirls are irregularly arranged, the width and mass, longitudinally, of the single strand deposit are basically constant and contribute to the uniformity of the strip 156, in which the four strands $a$, $b$, $c$ and $d$ are laid in intermingled and slightly offset relation, as indicated by the extremely diagrammatic showing of FIG. 8. With all the coils and loops and other intermingled relationships of the strands, the overall courses of the strands of each strip are generally straight and arranged in slightly spaced parallel relation.

For some cause, which may be an induction effect attending the strand projection, or the barrier of adjacent strands to lateral looping, there is a greater thickness build-up along the center portion of a strip than indicated by FIG. 8, particularly with a larger number of strands in a band. This is responsible for usual, slightly curved upper outline of a cross section of a strip.

With a strip of such a form, overlapping one-half the width of an adjacent parallel strip portion builds a lamination of uniform weight or thickness. Such an arrangement is illustrated in FIG. 9, wherein a pull wheel 160 is shown projecting a continuous strip 156 back and forth across the conveyor 61. The full width of the strip 156 is shown in the broken away section of the lamination or mat 162. Because of the repeated overlapping, half of each strip cross portion is always covered by an adjacent parallel cross portion and the true strip width is not discernible. While two laminations are actually created by such an operation, with the two sets of parallel cross strips angled to each other, one only is illustrated in FIG. 10.

As there portrayed the cross strip 156a is half covered by the following parallel cross strip 156b, with all strips of the parallel set of the lamination 162 in like superimposed relation.

While this showing is theoretical to the extent that it omits the cross strips of the set angled to and which pass over and under the cross strips illustrated as previously explained, from a structural standpoint, a distinct lamination is still present. A second lamination of the same nature is formed by the angled set of cross strips. The two laminations are integrated into a composite layer by the resulting rough weaving effect of the angled strips passing over and under each other.

Should the effective width of a strip be approximately the same as the actual width, practically no overlapping of parallel cross strip portions would be necessary. They could then be laid in edge abutting relation. Such a situation might arise where there is a particularly high strand projection rate to build a thicker strip, and uniformity of thickness or uniformity of weight distribution is not essential in the final product.

Apparatus arranged to project strips in this manner is schematically shown in FIG. 11. The first pull wheel 160 deposits a reciprocating strip with parallel cross strip portions 164 on the conveyor 61. These cross strips are spaced the strip width apart.

The operation of the following pull wheel 166 is synchronized to lay a strip with parallel cross portions 168 disposed between the cross strip portions 164. A filled in mat 170 is thus created.

The relative positioning of the cross strips 164 and 168 on the conveyor 61 is illustrated in the sectional view of FIG. 12. A slight edge overlapping of the last laid strips 168 is indicated.

As in all other cases, there would in the present instance be a duplicate lamination composed of the cross strips angled to those here specifically identified and an integration of the two laminations by the slight interweaving between the angled strips.

In general practice, the thin mat 170 would only be an incremental part of a mat or other body built up by strands projected from a series of probably eight or more pull wheels. In spite of the multiplicity of layers, the final product can be made to have a thickness of less than one-eighth of an inch. Because of the natural flat lay of the thin strips, ironing or compression of the mat to produce a smooth compacted product is limited. This contrasts with the severe, fiber crushing, repeated compressions usually necessary where fibers or fibrous strands are laid in bulky masses to create a mat.

Referring to FIGS. 1, 13 and 14, the edge establishing apparatus is effective to reduce the width if the longitudinal mat 60 of loosely integrated strands advancing on the conveyor 61 to the oven 82. Material of the advancing mat 60 at a marginal region along each longitudinal edge is subjected to a stream of gaseous fluid, e.g. air, that is effective to fold successive increments of the mat 60 in the marginal region to form a new edge. When the nozzles 66 and 68 are in fixed relation to the advancing mat 60 as shown and the mat 60 advances along a linear path, each of the streams effects a folded edge that is straight and parallel to the other folded edge; see the folded edges E and E' shown in FIG. 13. The dashed lines M and M' indicate the mat material folded under the mat 60 by the stream from each of the nozzles 66 and 68.

In a broad sense, the edge establishing apparatus, although shown in a continuous glass strand mat making operation, can effect folded edges at marginal regions of foldable flexible sheet material generally. For example, the edge establishing apparatus can fold flexible sheet material like paper and metal sheet material in-addition-to the various forms of continuous glass strand mats disclosed herein. The edge making apparatus subjects material at the marginal region of sheet material to a stream of gaseous fluid effective to fold the sheet in such region to form the edge. Normally the flexible sheet material is advanced on a porous conveyor as shown in the figures, but it is possible to effect the folded edge (reduced width) by moving the nozzles 66 and 68 with respect to the sheet material, which may be kept stationary. And the sheet material can be supported on an uninterrupted surface, e.g. belt conveyor.

In the embodiment shown the nozzles 66 and 68 are converging nozzles. And a gaseous fluid, such as air, under pressure is supplied from a conventional source of such fluid under pressure. The gaseous stream released from the outlet of each of the nozzles 66 and 68 is generally conical in shape with its cross section increasing as the stream proceeds away from its nozzle. A higher energy portion of the stream is located generally centrally of the stream as more clearly indicated by the dashed lines in FIG. 14.

The position of each of the nozzles 66 and 68 is the same with respect to the advancing mat 60, but on opposite sides thereof. The nozzles are above and some what laterally spaced from the sides of the mat 60. As shown in FIG. 13 the fluid streams from the nozzles 66 and 68 make an angle A and B respectively with the direction of mat movement on the conveyor. Hence, the flow of fluid in the streams impinging the mat 60 is generally against the movement of the mat 60 on the conveyor 61. As shown angles A and B are equal. In practice, these angles can vary from small, e.g., 10° and less, to large, e.g. 80° and more, but less than 90°. Hence, it is understood that the streams can be oriented from positions where the streams are almost directly opposing the direction of mat movement to where the streams are almost normal to mat movement. An angle A and B of from 40° to 50° is preferred. Under some circumstances it may be useful to orient the nozzles such that angles A and B are unequal. As seen in FIG. 14 the nozzle 66 (and also the nozzle 68) makes an angle C with the horizontal. In practice angle C is normally between 20° to 30°. It is noted that each of the nozzles 66 and 68 can be located at a different location along the length of the advancing mat 60.

The stream of gaseous fluid released from each of the nozzles 66 and 68 is directed obliquely against the mat 60 such that a component of velocity of the fluid flows inwardly of the mat 60 across its upper surface in a direction generally parallel to the horizontal plane of the mat 60 in selected marginal regions. This component of velocity establishes a region of reduced pressure at the upper surface of the mat 60. The atmospheric forces acting on the material of the mat 60 in the edge region are not longer in equilibrium. Hence, the higher atmospheric pressure under the mat 60 in the edge region moves or pushes the mat to lift the material at the edge off the conveyor 61 into the reduced pressure region. The lifted edge of the mat 60 comes into the influence of the higher energy portion of the stream. And this higher energy portion moves the lifted edge towards the center of the mat to effect a folding of the mat in the marginal region and thereby form a new edge. In practice, the higher energy portion of each of the streams is directed inwardly of the original edge of the mat 60, although some of the outer lower energy portion of each of the streams may not impinge the mat 60.

The folding occurs as the fluid forces acting on the lifted edge becomes unbalanced as the lifted edge enters the high energy region of the stream. The material in the edge region of thy mat yields (folds) until the forces acting on it are in equilibrium. And this occurs when the edge approaches a disposition substantially parallel to the axis of the fluid stream.

The higher energy air portion of each of the streams can effect a folding over or a folding under of the material of the mat 60 at its edge regions. Generally speaking, a folding under is effected when the nozzles 66 and 68 release streams downwardly and inwardly of the mat 60 (see FIG. 14). Conversely, the material at the edge region is folded over the mat 60 when the nozzles are below the plane of the mat. The nozzles are positioned to direct streams upwardly and inwardly of the mat 60. The amount of mat folded (amount of mat width reduction) is primarily determined by the energy of the air stream impinging the mat. And this can be controlled, for example, by modifying the pressure of the fluid applied to the nozzles and changing the distances of the nozzles from the mat 60.

As shown the mat 60 is continuously advanced and the nozzles continuously release air streams. Hence, successive increments along the longitudinal marginal regions of the mat 60 are subjected to the air streams. Consequently, the streams from the nozzles 66 and 68 continuously form a folded edge.

The nozzles are shown in fixed position. But they can be moved to effect an increasing and decreasing of mat width along successive increments of the mat 60 to obtain desired variations in mat width.

The edge establishing apparatus is shown in an air atmosphere releasing gaseous fluid streams. But it is believed possible to effect an edge for flexible sheet material where at least the marginal portion of the sheet to be edged is submerged in a liquid and the marginal portion is subjected to a stream of fluid, either gaseous of liquid, effective to fold such portion to form the edge.

In view of the foregoing description of various aspects of the invention, it will be understood that modifications and variations may be effected in the method and product of the present invention without departing from the scope and spirit thereof.

We claim:

1. The method of producing a sheet-like body of glass strand comprising:
forming on a surface a sheet-like fibrous body capable of being folded without fold lines including glass strands disposed in strips oriented in overlapping relation back and forth across the body with the strands in each of the strips disposed in generally parallel and closely positioned courses and loops of the strands extending laterally across a substantial portion of the strip in interleaving relation with loops of other strands of the same strip advancing the surface along a linear generally horizontal path; and
directing a single stream of gaseous fluid against a marginal region of the sheet-like body from an outlet located in a position above and outwardly of the marginal region such that the stream is directed obliquely downwardly and inwardly of the fibrous body in a direction generally opposed to the direction of advancement of the surface to effectively move the body in such region into underlying folded relation to form an edge.

2. The method of claim 1 in which the stream is dirted obliquely downwardly at an angle of from 20°–20° with the horizontal and inwardly at an angle of from 40°–50° with the linear path of advancement of the surface.

3. The method of producing a sheet-like body of glass strands comprising:
drawing glass filaments from a body of molten glass;

gathering the filaments into groups of closely arrayed glass strands;
providing a generally horizontal linearly advancing receiving surface for the groups of strands below the region of filament gathering;
linearly projecting the groups of closely arrayed strands downwardly directly to the receiving surface while reciprocating the projected groups of strands back and forth across the receiving surface;
depositing the groups of strands on the receiving surface as strips to form a longitudinal sheet-like body of glass strands capable of being folded without fold lines including strips oriented in overlapping relation back and forth across the body; and
subjecting the marginal region at each of the longitudinal edges of the body to a stream of gaseous fluid from a nozzle outlet located outwardly of the marginal region and above the sheet-like body such that the stream is directed obliquely downwardly and inwardly of the fibrous body in a direction generally opposed to the direction of advancement of the surface to effectively fold successive increments of the body in such region into underlying relation to form an edge.

4. The method of claim 3 further including applying a liquid to the filaments prior to gathering them into strands and applying dry binder particles to the sheet-like body of glass strands before subjecting the body to the streams of gaseous fluid.

5. The method of claim 4 further including trimming the folded portions from the body.

6. Apparatus for production of a sheet-like body of glass strand comprising:
a receiving surface
means for forming on the receiving surface a sheet-like fibrous body capable of being readily folded without fold lines including glass strands disposed in strips oriented in overlapping relation back and forth across the body with the strands in each of the strips disposed in generally parallel and closely positioned courses and loops of the strands extending laterally across a substantial portion of the strip in interleaving relation with loops of other strands of the same strip;
means for advancing the receiving surface along a linear generally horizontal path; and
means for directing a stream of gaseous fluid against a marginal region of the sheet-like body with sufficient energy to fold the sheet-like fibrous body, such means being located in a position above and outwardly of the marginal region and oriented such that the stream is directed obliquely downwardly and inwardly of the fibrous body in a direction generally opposed to the direction of advancement of the surface to effectively fold the body in such region into underlying relation to form an edge.

7. Apparatus of claim 6 in which the means for directing the stream fluid includes a converging nozzle.

8. Apparatus of claim 7 in which the nozzle is held stationary.

9. Apparatus for production of a sheet-like body of glass strands comprising:
means for drawing glass filaments from a body of molten glass;
means for gathering the filaments into groups of closely arrayed glass strands;
a receiving surface for the groups of strands located below the filament gathering means;
means for advancing the receiving surface;
means for linearly projecting the groups of closely arrayed strands downwardly onto the receiving surface and for reciprocating the projected groups of strands across the receiving surface, the groups of strands being deposited on the receiving surface as strips to form a longitudinal sheet-like body of glass strands capable of being readily folded without fold lines including strips oriented in overlapping relation back and forth across the body; and nozzle means for subjecting a marginal region at each of the longitudinal edges of the body to a stream of gaseous fluid effective to fold successive increments of the body in such region, the nozzle being located outwardly of the marginal region and above the body in a position to direct the stream obliquely downwardly and inwardly of the fibrous body in a direction generally opposed to the direction of advancement of the surface such that the marginal region of the body is folded into underlying relation to form an edge.

* * * * *